(12) United States Patent
Katsunaga

(10) Patent No.: US 8,125,183 B2
(45) Date of Patent: Feb. 28, 2012

(54) CHARGING SYSTEM AND VEHICLE AND CHARGE CONTROLLER FOR THE CHARGING SYSTEM

(75) Inventor: Hiroshi Katsunaga, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 316 days.

(21) Appl. No.: 12/476,504

(22) Filed: Jun. 2, 2009

(65) Prior Publication Data

US 2009/0302801 A1     Dec. 10, 2009

(30) Foreign Application Priority Data

Jun. 6, 2008   (JP) ................................ P2008-149521

(51) Int. Cl.
    *H02J 7/00*      (2006.01)
(52) U.S. Cl. ...................................... 320/109; 320/104
(58) Field of Classification Search .................. 320/109, 320/104
See application file for complete search history.

(56) References Cited

U.S. PATENT DOCUMENTS

| 4,218,644 | A | 8/1980 | Bourke et al. |
| 5,623,194 | A | 4/1997 | Boll et al. |
| 6,104,160 | A | 8/2000 | Iwata et al. |

FOREIGN PATENT DOCUMENTS

| JP | 8-111909 | 4/1996 |
| JP | 10-262305 | 9/1998 |
| JP | 2006-325317 | 11/2006 |
| JP | 2008-61432 | 3/2008 |

OTHER PUBLICATIONS

English language Abstract of JP 2008-61432, Mar. 13, 2008.
English language Abstract of JP 8-111909, Apr. 30, 1996.

*Primary Examiner* — Reena Aurora
(74) *Attorney, Agent, or Firm* — Greenblum & Bernstein, P.L.C.

(57) ABSTRACT

A charging system for charging a vehicle battery using a commercial power supply available in a construction on the ground includes a charge device, a power line, a time setting unit, and a control unit. The charge device mounted on a vehicle charges the vehicle battery. The power line connects between the construction on the ground and the vehicle. The time setting unit sets a charge start time for starting battery charging. The control unit is used for starting battery charging at the charge start time.

19 Claims, 7 Drawing Sheets

FIG. 4

| CHARGE/DISCHARGE FLAG (0/1) | CHARGE START CONDITION (2008/05/31/2300) | SELECTION OF CHARGE COMPLETION CONDITION (CHARGE LEVEL) | CONDITION FOR CHARGE COMPLETION (FULL CHARGE) |
|---|---|---|---|

CHARGING SYSTEM AND VEHICLE AND CHARGE CONTROLLER FOR THE CHARGING SYSTEM

BACKGROUND OF THE INVENTION

The present invention relates to a charging system for a battery installed in a vehicle and a vehicle and a charge controller for the charging system.

The present invention relates to a charging system for a battery installed in a vehicle.

A charging system for a vehicle battery is known which uses a commercial power supply available in a general house. A charging system is disclosed in Japanese Patent Application Publication No. 2008-61432, according to which an electronic control unit (ECU) is installed in a vehicle for controlling the vehicle battery charging. When charging a vehicle battery, a charging connector of the vehicle is connected to an outdoor outlet of a house through a charging cable. An identification (ID) box is installed in the house for authentication through communication with the ECU when charging the vehicle battery. If the authentication is established between the ID box and the ECU, charging is allowed. This helps to prevent vehicle theft effectively.

Another charging system disclosed in Japanese Patent Application Publication No 8-111909 has a charging device for charging a battery for an electric vehicle and a control unit controlling the charging device in accordance with the charge condition of the vehicle battery. The control unit has a charge time calculator determining the battery charge time based on the charge condition of the vehicle battery, a charge start time calculator determining the charge start time based on the battery charge completion time and the charge time, and a battery charge actuator for starting battery charging at the calculated charge start time.

According to the charging system disclosed in the above Publication No. 2008-61432, the charging cable is connected before the start of charging. Thus, battery charging cannot be started while the user of the vehicle is absent. In other words, the battery charging may not be performed at the user's desired time.

According to the charging system disclosed in the above Publication No. 8-111909, the above-described step of charging is performed by the control unit installed in the vehicle. If various settings for charging could be done in the house, user-friendliness may be improved. However, it is not preferable to add devices for communication between the house and the vehicle.

The present invention is directed to providing a charging system using a commercial power supply of a general house and making possible battery charging at any time desired by the user of the vehicle.

SUMMARY OF THE INVENTION

In accordance with the present invention, a charging system for charging a vehicle battery using a commercial power supply available in a construction on the ground includes a charge device, a power line, a time setting unit, and a control unit. The charge device mounted on a vehicle charges the vehicle battery. The power line connects between the construction on the ground and the vehicle. The time setting unit sets a charge start time for starting battery charging. The control unit is used for starting battery charging at the charge start time.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

FIG. 4 shows an example of charge control data in the charging system according to the preferred embodiment of the present invention;

DETAILED DESCRIPTION OF THE PREFERRED EMBODIMENTS

Figure 1:
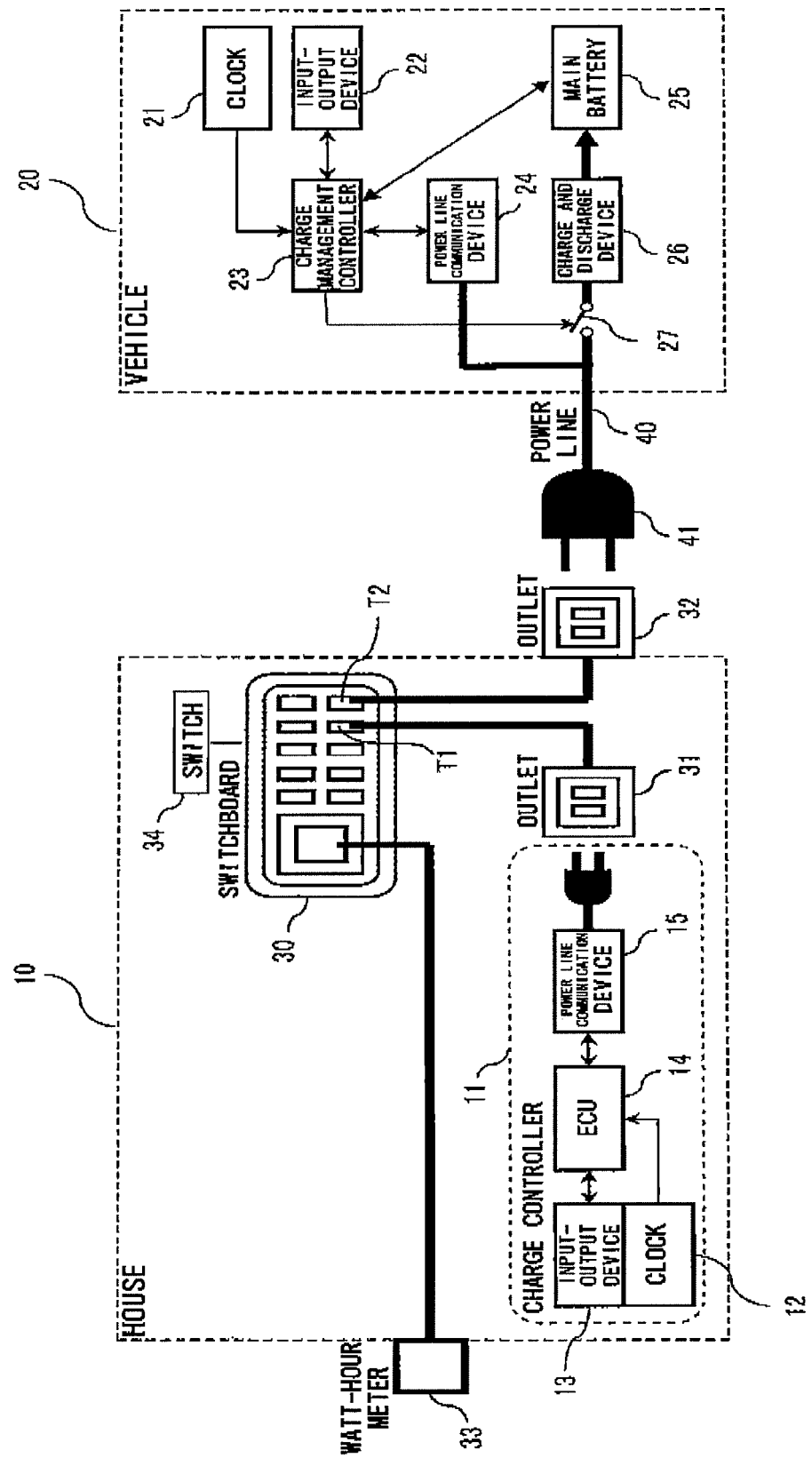
FIG. 1 is an illustrative view showing a configuration of a charging system according to a preferred embodiment of the present invention.

FIG. 1 is an illustrative view showing a configuration of a charging system according to a preferred embodiment of the present invention. Referring to FIG. 1, there is shown a charging system 1 for charging a battery mounted on a vehicle 20 using a power supply available in a construction on the ground, such as house 1. The house 10 corresponds to a construction on the ground.

A charge controller 11 is provided in the house 10. The charge controller 11 has a clock 12, an input-output device (time setting unit as time setting means) 13, an ECU (control unit as control means or first control unit as first control means) 14, and a power line communication device (communication device as communication means) 15.

The clock 12 outputs real time digital data. The input-output device 13 has an input section for receiving input data from a user and an output section for providing output data that is necessary for battery charging. The input section is not limited to any specific device, but may be a touch panel device or an input device having buttons to input numbers and the like. The output section is provided by, for example, a display device. The user may set data of charge start conditions including a charge start time using the input-output device 13.

The ECU 14 receives real time digital data from the clock 12 and, if necessary, controls the charging operation in conjunction with a charge management controller 23 installed in the vehicle 20. The power line communication device 15 controls communication between the house 10 and the vehicle 20 through a power line 40. The power line communication device 15 is connected to an outlet 31 in the house 10.

A switchboard 30 having a plurality of terminals (T1, T2, . . . ) is provided in the house 10 for distributing electric power. to a plurality of outlets (31, 32 . . . ) of the house 10. The switchboard 30 is connected to a commercial power line network through a watt-hour meter 33.

The outlet 31 is disposed inside the house 10 and connected to the terminal T1 of the switchboard 30 The outlet 32 is disposed outside the house 10, and connected to the terminal T2 of the switchboard 30. The terminals T1, T2 are connected to each other within the switchboard 30, or may be connected to each other through a switch 34. It may be so arranged that the switch 34 selectively connects between the terminals of the switchboard 30 in accordance with the control of the ECU 14.

The vehicle 20 has a clock 21, an input-output device (time setting unit or as time setting means) 22, a charge management controller (control unit as control means or second control unit as second control means) 23, a power line communication device (communication device as communication means) 24, a main battery 25, and a charge and discharge device (charge device and discharge device) 26. The clock 21, the input-output device 22, and the power line communication device 24 in the vehicle 20 are substantially the same as counterparts 12, 13, 15 in the house 10, respectively.

The charge management controller 23 receives real time digital data from the clock 21 of the vehicle 20 and monitors the conditions of the main battery 25, such as an output voltage and a charge level. The charge management controller 23 controls the charging operation by itself, or in conjunction with the ECU 14 of the house 10.

The charge and discharge device 26 charges the main battery 25 using electric power supplied through the power line 40. In this case, the charge and discharge device 26 operates as an AC-DC converter. The charge and discharge device 26 may supply electric power charged in the main battery 25 to the house 10 through the power line 40. In this case, the charge and discharge device 26 operates as a DC-AC inverter. A switch 27 is disposed between the power line 40 and the charge and discharge device 26, and its operation is controlled by the charge management controller 23. The switch 27 may be incorporated in the charge and discharge device 26.

A power plug 41 is provided at the end of the power line 40. Before charging the main battery 25, or supplying electric power charged in the main battery 25 to the house 10, the power plug 41 is inserted into the outlet 32.

When charging the main battery 25 in the above-described charging system 1, the user inputs data of charge start conditions including the data of charge start time through the input-output device 13 or 22. Then, the ECU 14 and the charge management controller 23 transmit and receive control data through the power line communication devices 15, 24. When the charge start conditions are satisfied, the charge management controller 23 turns the switch 27 ON, thereby causing the charge and discharge device 26 to start charging the main battery 25. Power line communication using the power line communication devices 15, 24 is not limited to the use of a specific protocol, but may use any known protocol.

In the charging system 1 constructed as described above, the charging data including the data of the charge start conditions may be set either in the house 10, or in the vehicle 20. The following describes the structure and the operation in the case of setting the charging data in the house 10.

Figure 2:
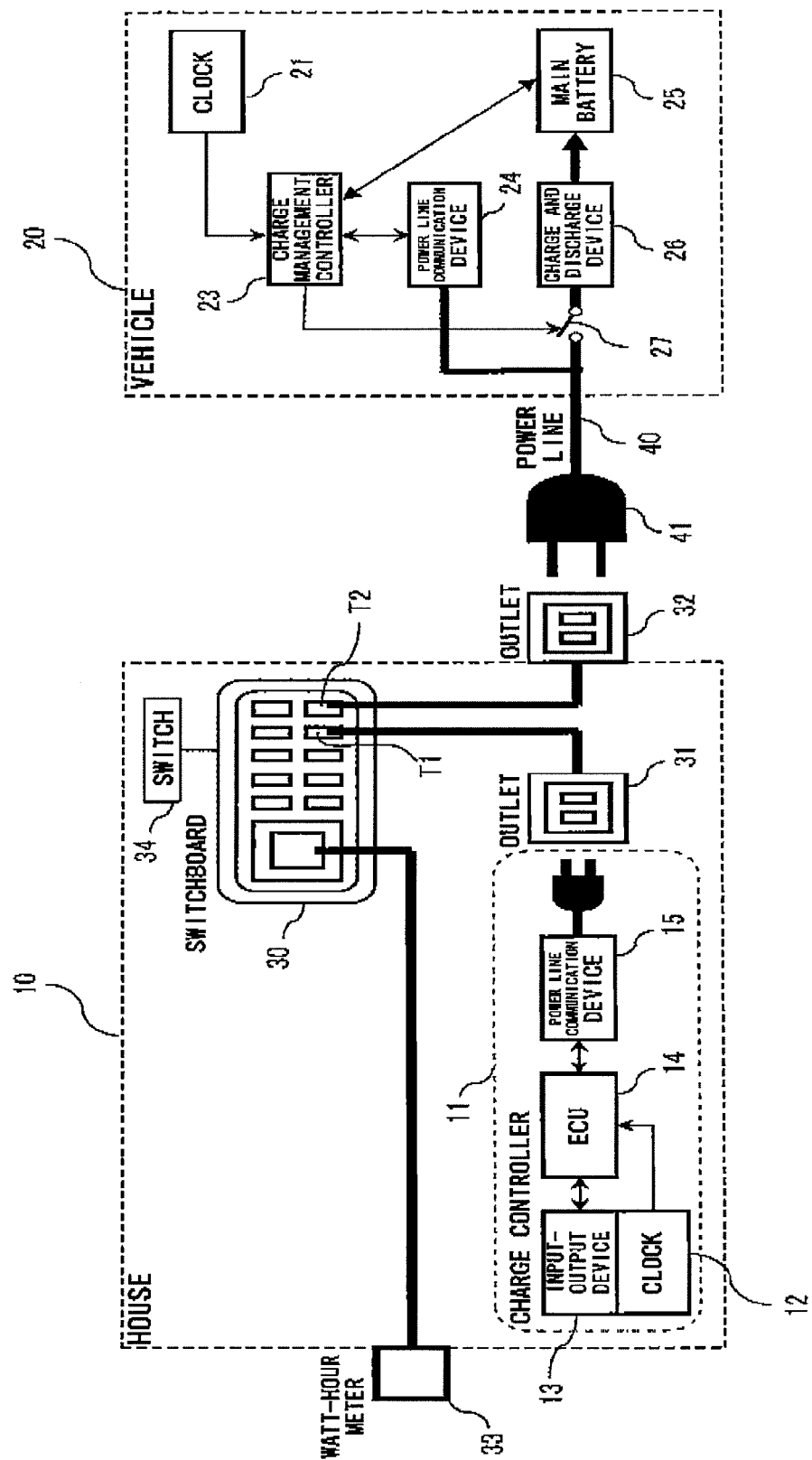
FIG. 2 is an illustrative view showing a configuration of the charging system according to the preferred embodiment of the present invention in the case of setting charging data in a house.

FIG. 2 is an illustrative view showing the configuration of charging system in the case of setting charging data in the house 10 In this configuration of the charging system, the vehicle 20 needs no input-output device 22, and the rest of the configuration of the charging system is substantially the same as that described above with reference to FIG. 1.

Figure 3:
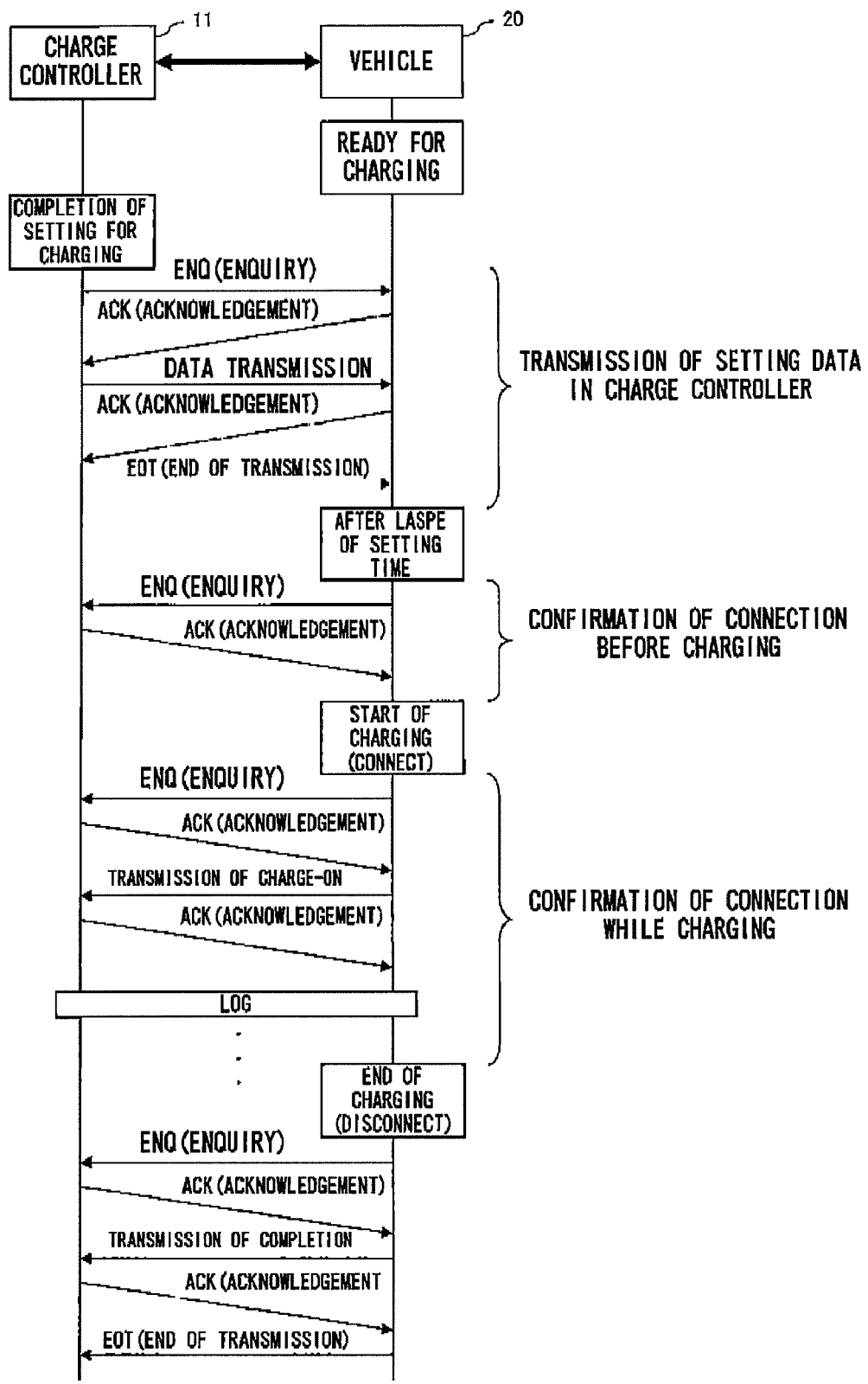
FIG. 3 is a sequence diagram showing the steps of operation in the case of FIG. 2.

FIG. 3 is a sequence diagram showing the steps of operation in the charging system according to the preferred embodiment of the present invention in the case of setting charging data in the house 10. In FIG. 3, it is supposed that the vehicle 20 is ready for charging, or the charge management controller 23 and the power line communication device 24 are ready for operation, and also the power plug 41 of the power line 40 is inserted into the outlet 32.

The user inputs data of the charging operation through the input-output device 13 which is provided in the charge controller 11. The data of the charging operation according to the preferred embodiment of the present invention includes:
(1) charge start time, and
(2) condition for charge completion.
The condition for charge completion may be, for example, a charge level of the main battery 25, such as full charge or 90 percent charge. Thus, the main battery 25 may be charged to any desired level. The condition for charge completion may be the charge completion time. In this case, the condition may be set such that the charging is performed in the midnight when the electric rate is relatively low.

Subsequently, the step of transmitting the setting data is performed as follows. When the ECU 14 of the charge controller 11 transmits an enquiry signal (ENQ) to the charge management controller 23 of the vehicle 20, the charge management controller 23 returns an acknowledgement signal (ACK), accordingly. The ECU 14 receiving the ACK transmits charge control data. Referring to FIG. 4, the charge control data includes a charge/discharge flag, charge start condition, selection of charge completion condition, and charge completion condition. The charge/discharge flag identifies which of the charging or discharging operation is selected. The following description will be made in the case when the charging operation is selected. The charge start condition specifies the start time for charging. The selection of condition for charge completion determines which of the charge level and the charge completion time is selected as the condition for charge completion.

The charge management controller 23 stores the received charge control data in its memory and returns an acknowledgement signal (ACK). The ECU 14 of the house 10 receiving the ACK transmits an end of transmission signal (EOT). This completes the step of transmitting the setting data.

After completing the above-described step of transmitting the setting data, the charge management controller 23 monitors the clock 21 of the vehicle 20. When the charge start time specified by the start condition is reached, the step of confirming the connection is performed as follows before starting the charging operation. That is, the charge management controller 23 transmits an enquiry signal (ENQ), and the ECU 14 returns an acknowledgement signal (ACK). The charge management controller 23 receiving the ACK starts the charging operation. Specifically, the charge management controller 23 turns on the switch 27, thereby starting the charge and discharge device 26.

During the charging operation, the charge management controller 23 constantly monitors whether or not the condition for charge completion is fulfilled. If the full charge is specified as the condition of charge completion, the charge management controller 23 monitors the output voltage of the main battery 25 and stops the battery charging when the output voltage is increased to a level corresponding to the condition of full charge. This is accomplished by turning OFF the switch 27 thereby to stop the charge and discharge device 26.

During the charging operation, the step of confirming the connection is performed as follows. The charge management controller 23 transmits an enquiry signal (ENQ), and the ECU 14 returns in response thereto an acknowledgement signal (ACK). Then, the charge management controller 23 periodically transmits charge-on data indicating that the charge and discharge device 26 is charging the main battery 25. Then, the ECU 14 returns an acknowledgement signal (ACK) every time when the charge-on data is received. By this step of confirming the connection, the charge management controller 23 can confirm whether or not the connection between the house 10 and the vehicle 20 is established correctly. If the power plug 41 of the power line 40 is removed from the outlet 32, or the power line 40 is disconnected, the charge management controller 23 fails to receive the ACK, thereby detecting a connection error. When the connection error is detected, the charge management controller 23 may output an alarm signal.

According to the charging system 1 of the preferred embodiment, the communication between the ECU 14 and the charge management controller 23 is performed through the power line 40 which transmits electric power for charging. Thus, if an error occurs in transmission of electric power through the power line 40, the charge management controller 23 can detect the error instantly and directly. The ECU 14 and/or the charge management controller 23 may store logs of the step of confirming the connection during the charging operation.

When the charging is completed, the charge management controller 23 transmits an enquiry signal (ENQ), and the ECU 14 returns an acknowledgement signal (ACK). Then, the charge management controller 23 transmits charge completion data indicative of the completion of charging. The ECU 14 receives the charge completion data, and returns an acknowledgement signal (ACK). The charge management controller 23 receiving the ACK transmits an end of transmission signal (EOT) This completes a series of steps of the charging operation.

According to the procedure shown by the sequence diagram in FIG. 3, the charge management controller 23 installed in the vehicle 20 monitors a charge start time, but the present invention is not limited to the step. It may be so arranged that, after the charge start time is input into the charge controller 11 of the house 10, the charge controller 11 monitors to determine whether or not the real time reaches the charge start time and transmits a signal to the vehicle 20 to start charging when the charge start time is reached.

The discharging step for supplying electric power from the main battery 25 to the house 10 is substantially the same as the step shown by the sequence diagram in FIG. 3. In the discharging step, the charge management controller 23 makes the charge and discharge device 26 to operate as DC-AC inverter. The charge controller 11 controls the operation of the switch 34 to change connections of the switchboard 30 so as to transmit electric power generated by the main battery 25 to the desired devices such as electric equipment and a battery in the house 10.

Figure 5:
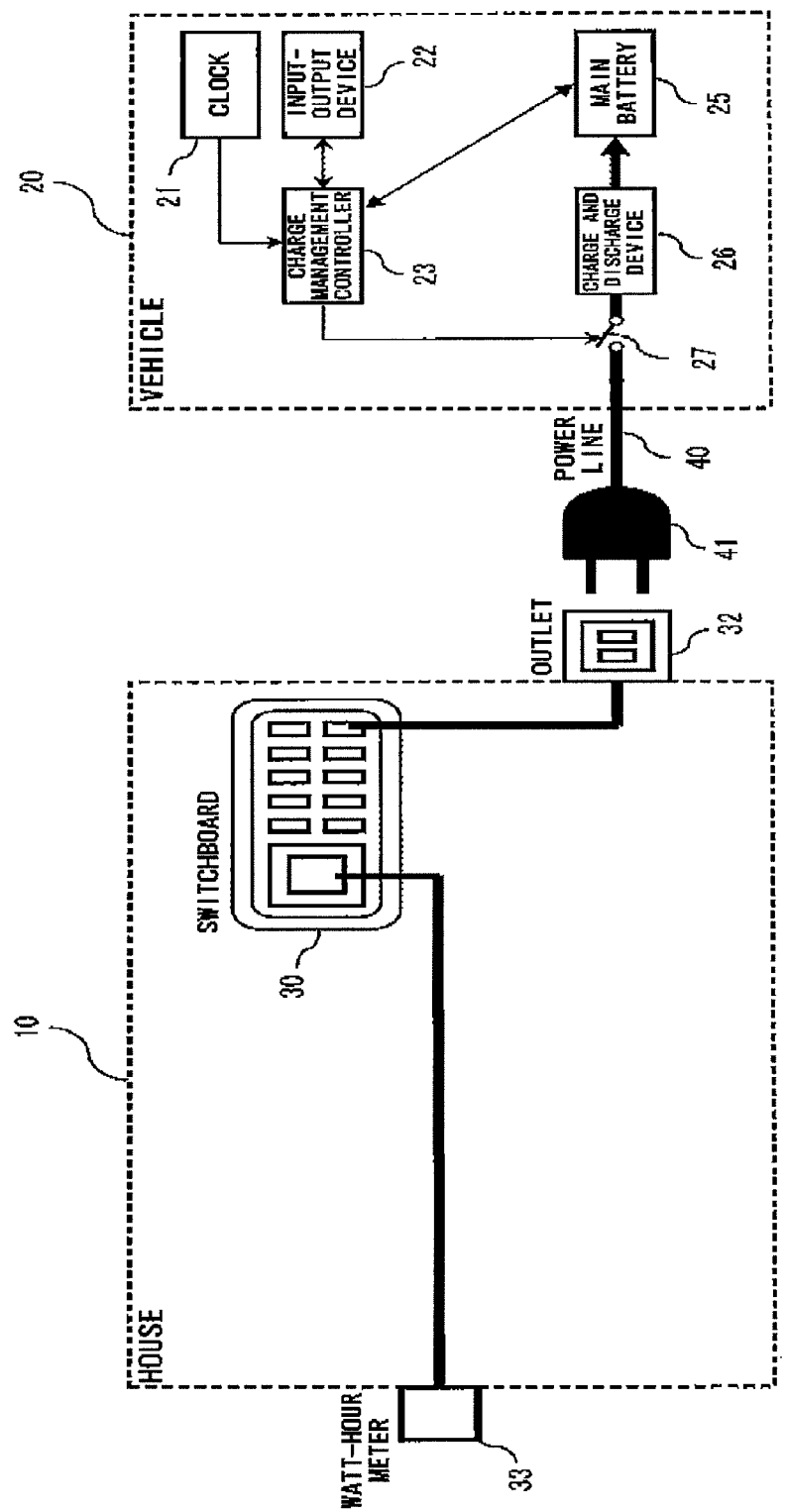
FIG. 5 is an illustrative view showing a configuration of the charging system according to the preferred embodiment of the present invention in the case of setting charging data in a vehicle.

FIG. 5 is an illustrative view showing the configuration of the charging system in the case of setting charging data at the vehicle 20. In this case, the house 10 may dispense with the charge controller 11, and the vehicle 20 may dispense with the power line communication device 24. The rest of the configuration of the charging system in FIG. 5 is substantially the same as that described above with reference to FIG. 1.

Figure 6:
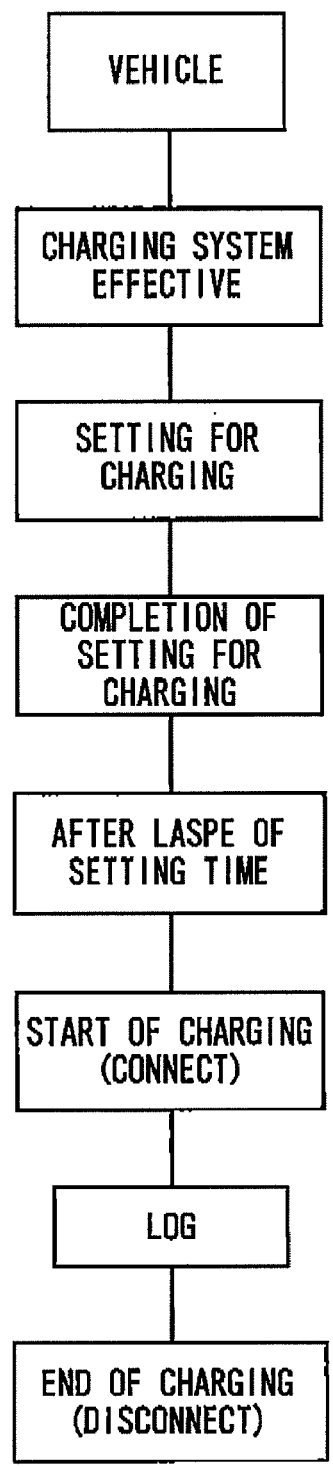
FIG. 6 is a sequence diagram showing the steps of operation in the case of FIG. 5.

FIG. 6 is a sequence diagram showing the steps of operation in the case of setting charging data in the vehicle 20 The operation of the charge management controller 23 is basically the same as that in the case of setting charging data in the house 10. The charge management controller 23 does not necessarily need to communicate with the ECU 14. In the case of setting charging data in the vehicle 20, the ECU 14 and the power line communication device 15 are installed in the house 10, and the power line communication device 24 is mounted on the vehicle 20. The step of confirming the connection may be performed during the charging operation.

Figure 7:
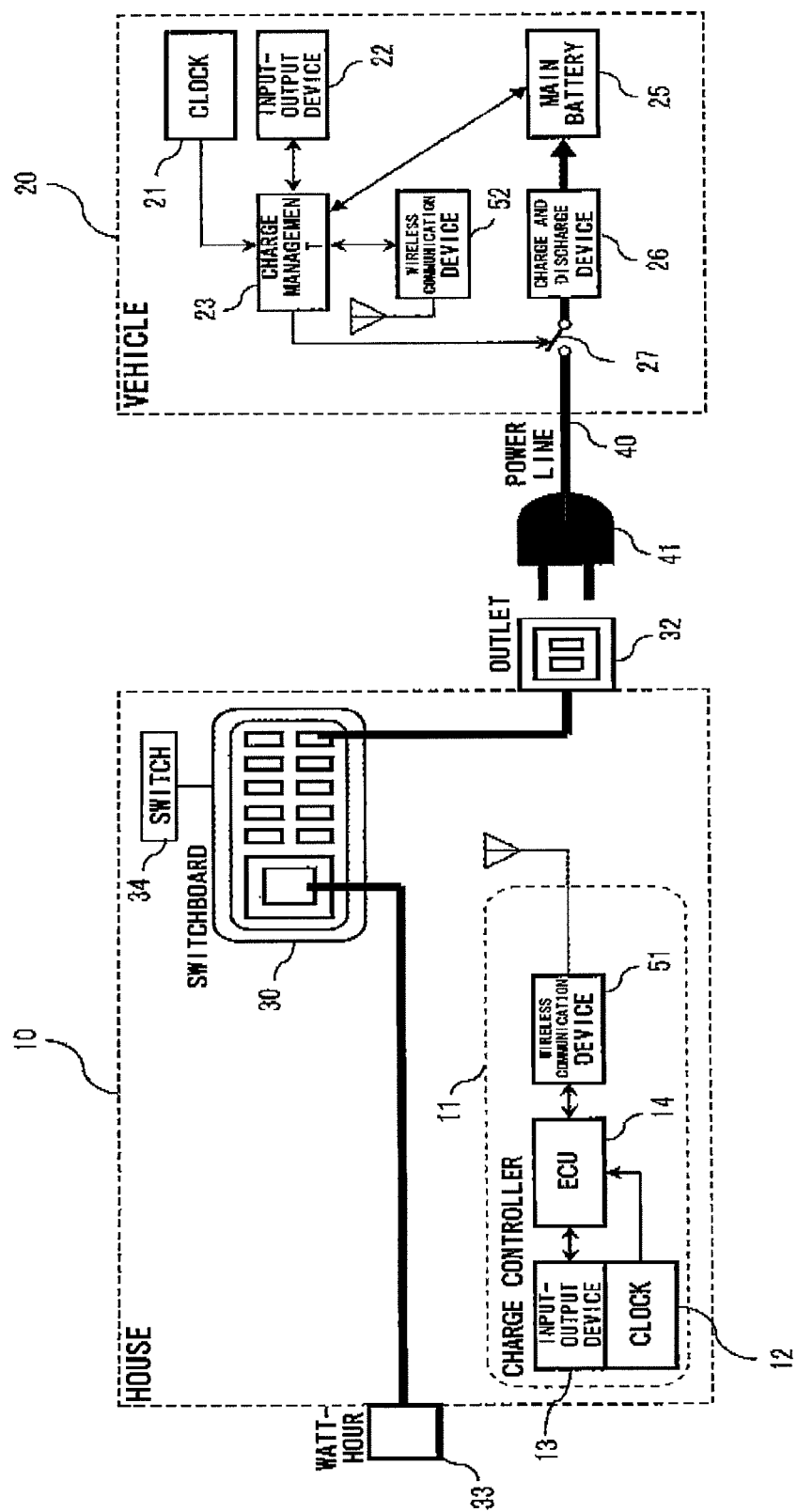
FIG. 7 is an illustrative view showing a configuration of a charging system according to another preferred embodiment of the present invention.

According to the above-described preferred embodiment, data is transmitted between the house 10 and the vehicle 20 by power line communication, but the present invention is not limited to this structure. Alternatively, data may be transmitted by wireless as shown in FIG. 7. In this configuration, the charge controller 11 has a wireless communication device 51 instead of the power line communication device 15, and the vehicle 20 has a wireless communication device 52 instead of the power line communication device 24. Therefore, radio signals are transmitted between the wireless communication devices 51, 52 The wireless communication protocol is not limited, but it may use, for example, IEEE 802.11 standard or Worldwide Interoperability for Microwave Access (WiMax).

The start time does not necessarily be set for the charging or discharging, but the charging or discharging may be started immediately.

What is claimed is:

1. A charging system for charging a vehicle battery using a power supply provided in a construction on the ground comprising:
   a charger that is configured to charge the vehicle battery and is mountable on a vehicle;
   a power line that connects the construction on the ground and the vehicle;
   a time setter configured to set a charge start time to start charging the vehicle battery;
   a controller configured to start charging the vehicle battery at the charge start time; and
   a communicator that allows communication between the construction on the ground and the vehicle,
   wherein the time setter is provided in the construction on the ground,
   the controller includes a first controller provided in the construction on the ground and a second controller in the vehicle,
   the first controller is configured to transmit data indicating the charge start time to the second controller, and
   the second controller is configured to start charging the vehicle battery in accordance with the data indicating the charge start time transmitted from the first controller.

2. The charging system according to claim 1, wherein the communicator communicates through the power line.

3. The charging system according to claim 1, wherein the communicator communicates wirelessly.

4. The charging system according to claim 1, wherein after the charger starts charging the vehicle battery, the controller periodically transmits and receives data between the first controller and the second controller for monitoring a condition of the charging operation.

5. The charging system according to claim 1, further comprising a clock provided in the vehicle, wherein the second controller monitors a time of the clock, and when the charge start time is reached, the second controller activates the charger.

6. The charging system according to claim 1, further comprising a clock provided in the construction on the ground, wherein the first controller monitors a time of the clock, and when the charge start time is reached, the first controller transmits a signal to the second controller to activate the charger.

7. The charging system according to claim 1, wherein, while communicating between the construction on the ground and the vehicle, the second controller transmits an inquiry signal, the first controller returns an acknowledgement signal in response to the inquiry signal, the second controller periodically transmits charge-on data indicating that the charger is charging the vehicle battery, and the first controller returns an acknowledgement signal every time the charge-on data is received.

8. The charging system according to claim 7,
wherein the first controller transmits the inquiry signal to the second controller, when the time setter completes setting the charge start time, and transmits the charge start time to the second controller when the acknowledgment signal is received,
the second controller transmits another acknowledgement signal in response to the reception of the charge start time, and the first controller transmits a transmission end signal when receiving the another acknowledgment signal in response to the reception of the charge start time,
when the charge start time is reached after the transmission end signal is received, the second controller sends an inquiry signal to the first controller, and the first controller returns an acknowledgement signal in response to the inquiry signal from the second controller, and
when the second controller receives the acknowledgement signal from the first controller, the second controller starts charging the vehicle battery,
wherein the second controller periodically transmits the charge-on data using the power line, and the first controller returns the acknowledgement signal in response to the charge-on data through the power line,
wherein the second controller outputs an alarm indicating a connection error in the power line, when the second controller does not receive the acknowledgment signal in response to the charge-on data from the first controller.

9. The charging system according to claim 7, wherein the second controller outputs an alarm indicating a connection error in the power line, when the second controller does not receive an acknowledgement signal in response to charge-on data from the first controller.

10. The charging system according to claim 1, wherein the time setter further sets a condition for charge completion, and when the condition for charge completion is fulfilled, the charger is stopped.

11. The charging system according to claim 10, wherein the condition for charge completion is based on a charge level of the vehicle battery.

12. The charging system according to claim 10, wherein the condition for charge completion is based on a charge completion time.

13. The charging system according to claim 1, further comprising a discharger configured to discharge electric power stored in the vehicle battery to the construction on the ground through the power line.

14. The charging system according to claim 1, each of the first and second controllers including a clock, the second controller including a battery discharge device configured to selectively supply battery power from the vehicle to the construction on the ground.

15. A vehicle for use with a charging system for charging a vehicle battery, the vehicle comprising:
a charger configured to charge the vehicle battery;
a power line configured to receive electric power for charging the vehicle battery, and the power line having a power plug;
a vehicle communicator configured to communicate through the power line with a communication device located outside the vehicle; and
a controller configured to start charging the vehicle battery at a charge start time received from the communication device by communication between the vehicle communicator and the communication device through the power line.

16. The vehicle according to claim 15, wherein during charging operation, the controller periodically transmits charge-on data indicating that the charger is charging the vehicle battery through the power line, and receives an acknowledgment signal from the communication device every time after the charge-on data is transmitted through the power line,
wherein the controller outputs an alarm indicating a connection error in the power line, when the controller does not receive the acknowledgment signal in response to the charge-on data within a predetermined period of time.

17. The vehicle according to claim 16, wherein the controller returns a first acknowledgment signal in response to an inquiry signal received from the communication device, returns a second acknowledgment signal in response to a reception of the charge start time after transmission of the first acknowledgement signal, and receives a transmission end signal after transmission of the second acknowledgement signal, and
wherein the controller starts charging the vehicle battery when the charge start time arrives after receiving the transmission end signal.

18. A charge controller for use with a charging system for charging a vehicle battery installed on a vehicle spaced from the charge controller, the charge controller comprising:
a time setter configured to set a charge start time;
a communicator configured to communicate through a power line or with the vehicle; and
a controller configured to transmit the charge start time to the vehicle using the communicator through the power line.

19. The charge controller according to claim 18,
wherein the controller transmits an inquiry signal to the vehicle when the time setter completes setting the charge start time, and transmits the charge start time to the vehicle when a first acknowledgment signal in response to the inquiry signal is received from the vehicle, and
the controller transmits a transmission end signal when a second acknowledgment signal is received from the vehicle in response to the transmitted charge start time,
wherein during charging operation, the controller periodically receives charge-on data indicating that the vehicle battery is being charged from the vehicle through the power line, and returns an acknowledgment signal every time the charge-on data is received through the power line.

* * * * *